United States Patent [19]

Bilkenroth et al.

[11] Patent Number: 5,405,225
[45] Date of Patent: Apr. 11, 1995

[54] METHOD OF SANITIZING A POLLUTED AREA, PARTICULARLY AN UNREGULATED CONTAMINANT-CONTAINING REFUSE DUMP

[75] Inventors: Klaus-Dieter Bilkenroth, Hohenmölsen; Ortwin Caldonazzi, Leipzig; Herbert Baier, Bitterfeld; Manfred Heilmann, Freiberg; Hans-Jürgen Kretzschmar, Freiberg; Peter Czolbe, Freiberg, all of Germany

[73] Assignee: Rononta GmbH, Amsdorf, Germany

[21] Appl. No.: 58,939

[22] Filed: Jun. 21, 1993

[30] Foreign Application Priority Data

May 15, 1992 [DE] Germany .................. 42 16 473.7

[51] Int. Cl.⁶ .................................................. B09B 1/00
[52] U.S. Cl. .................................. 405/129; 405/263; 106/272; 106/900; 588/250
[58] Field of Search .............. 106/14.34, 14.39, 33, 106/272, 900; 166/292; 405/128, 129, 263–267; 588/249, 250

[56] References Cited

U.S. PATENT DOCUMENTS

| | | | |
|---|---|---|---|
| 3,775,147 | 11/1973 | Ferm .................................. | 106/271 |
| 3,787,346 | 1/1974 | Dickmann et al. .................. | 524/157 |
| 3,865,606 | 2/1975 | Neier et al. ......................... | 106/271 |
| 3,953,353 | 4/1976 | Barrett et al. ....................... | 252/174 |
| 4,151,272 | 4/1979 | Geary et al. ......................... | 424/68 |
| 4,687,520 | 8/1987 | Seng ................................... | 106/271 |
| 4,735,742 | 4/1988 | Ansmann ............................ | 252/312 |
| 4,748,196 | 5/1988 | Kuroda et al. ...................... | 524/43 |
| 4,765,922 | 8/1988 | Contamin et al. .................. | 252/90 |
| 4,919,934 | 4/1990 | Deckner et al. .................... | 424/401 |
| 5,262,453 | 11/1993 | Watanabe et al. .................. | 523/209 |

FOREIGN PATENT DOCUMENTS

| | | |
|---|---|---|
| 3330897 | 3/1985 | Germany . |
| 3407382 | 8/1985 | Germany . |
| 3409591 | 9/1985 | Germany . |
| 3415883 | 10/1985 | Germany . |
| 3419163 | 11/1985 | Germany . |
| 3439858 | 4/1986 | Germany . |
| 3604940 | 8/1987 | Germany . |
| 3722270 | 2/1988 | Germany . |
| 271064 | 8/1989 | Germany . |
| 3910504 | 10/1990 | Germany . |

OTHER PUBLICATIONS

Control Of Hazardous Material Spills, "Innovative Geotechnical Approaches to the Remedial In-Situ Treatment of hazardous Materials Disposal Sites", P. J. Huck, et al, May 13–15, 1980, pp. 421–426.
Computer Generated Search Results of the FIZT and STN data bases.

*Primary Examiner*—Randolph A. Reese
*Assistant Examiner*—John A. Ricci
*Attorney, Agent, or Firm*—Michael J. Striker

[57] ABSTRACT

The method of sealing a polluted area containing pollutants to prevent transport of the pollutants from the polluted area includes forming a sealing barrier layer around the polluted area underneath and/or next to it by feeding a liquid sealing material into the liquid permeable ground and fissures under and/or next to the polluted area or into the polluted area by a plurality of injection lances and/or pressure probes from above ground or from the surface of the polluted area. The liquid sealing material is a Montan wax emulsion or a mixture of the emulsion with earth and/or pollutants, the Montan wax emulsion is made from 10 to 20 parts by weight Montan wax, 3 to 5 parts by weight emulsifier, 100 parts by weight of water and from 0 to 10 by weight of a stabilizer.

33 Claims, 2 Drawing Sheets

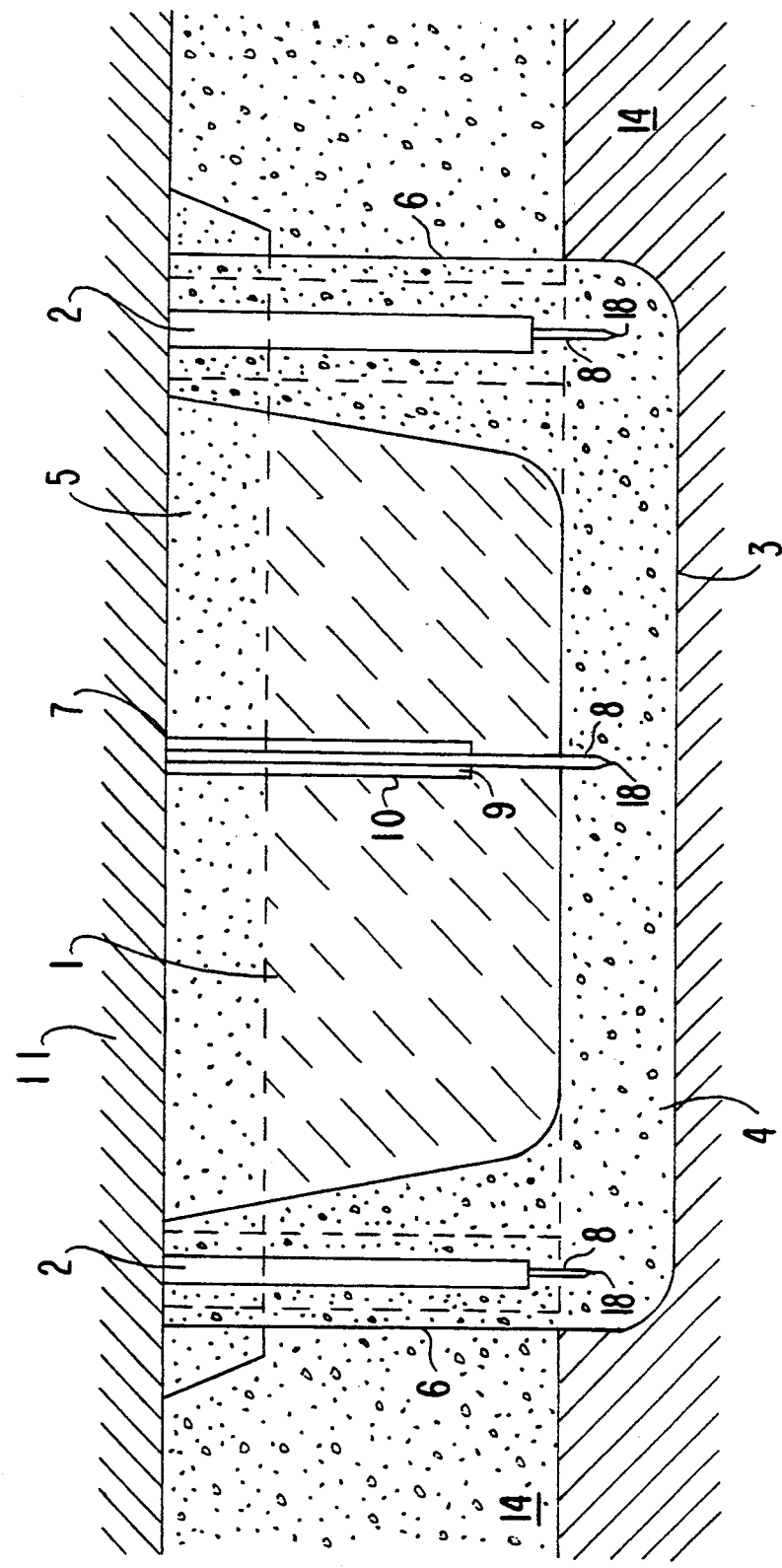

METHOD OF SANITIZING A POLLUTED AREA, PARTICULARLY AN UNREGULATED CONTAMINANT-CONTAINING REFUSE DUMP

BACKGROUND OF THE INVENTION

The present invention relates to a method of sanitizing a polluted area and, more particularly, to a method of at least partially sealing the polluted area by providing at least one sealing barrier layer in the liquid permeable ground layers under and/or next to the polluted area, over the polluted area and/or in the polluted area itself to prevent leakage of pollutants into the environment and thus sanitize the polluted area.

Different methods of this type are known, which encapsulate the refuse dump or the like, so that pollutants can not migrate from the polluted area. According to German Published Patent Application 3,419,163, a refuse or garbage dump can be sanitized by providing a vertical sealing wall, which has drainage means. It is possible to control the pollution level by pumping away the trickling water. It is however disadvantageous that a danger of polluting the ground water still exists when this method is used, because surface water can still enter the dumped material and reach the ground water from the bottom of the dumped material.

German Published Patent Application 3,604,940 describes a method of sanitizing a dump in which a concave hollow space made by mining methods under and beside the dumped material is filled with sealing material. However the high cost of this method and lack of a sufficient covering barrier layer to keep out surface water are both substantial disadvantages.

German Published Patent Application 3,415,883 suggests a method in which shafts are sunk next to the refuse dump and a cell-like and/or parallel array of injection ducts under the bottom of the refuse dump are provided. This method of sanitizing a refuse or garbage dump is very complicated from an engineering standpoint and expensive. Because of that the making of sealing barrier layers by this method can effectively take place only in special cases.

SUMMARY OF THE INVENTION

It is an object of the present invention to provide a process for sealing liquid permeable ground layers and fissures under or next to polluted areas, particularly unregulated refuse dumps, loaded with pollutants, so as to make a permanent, water-resistant barrier layer around the polluted area and thus sanitize the polluted area.

According to the invention, method of sealing dumped material deposited in liquid permeable ground and containing pollutants to prevent leakage of the pollutants from the dumped material into the ground, comprising the step of feeding a liquid sealing material into the dumped material, the liquid permeable ground and fissures next to the dumped material or both, wherein the liquid sealing material comprises a Montan wax emulsion and advantageously consists of a mixture of the dumped material or ground with the Montan wax emulsion.

The invention also resides in a Montan wax emulsion comprises 10 to 20 parts by weight of a Montan wax, 3 to 5 parts by weight of an emulsifier and 100 parts by weight water used as a liquid sealing material. Advantageously in a preferred embodiment the Montan wax emulsion also includes up to 10 parts of a stabilizer.

In the preferred embodiment of the invention described here the Montan wax is unrefined Montan wax and in this example consists of 83% by weight wax components, 13% resin material and 4% asphalt material. The 83% by weight wax components consist of ester component, 22% free acids and 4% free alcohols, ketones, lactones and hydrocarbon materials.

The emulsifier can be an ethoxylated fatty alcohol or mixtures of ionogenic materials, e.g. sodium alkyl polyglycol ether sulfates containing 10 to 16 carbon atoms, and nonionogenic materials, e.g. alkyl phenyl polyglycol ethers containing 10 to 16 carbon atoms. The ethoxylated fatty alcohol is a fatty alcohol polyglycol ether which has been ethoxylated with from 8 to 12 ethylene oxide molecules, preferably 9. The stabilizer can be a polymer or a mineral solid, preferably a clay such as Bentonite. The amount of Bentonite used depends on the grain size of the sand into which the composition is injected. For example, in earth with a grain size diameter of 0.06 to 2 mm the Montan wax emulsion contains 3% Bentonite. A uniform distribution of the Montan wax molecules is obtained because of the presence of the emulsifiers in the liquid sealing material.

The particularly advantageous features of the invention are that a liquid impermeable vertical sealing barrier layer around edge regions of the dumped material or a dish like sealing barrier layer in which the dumped material sits are formed, and, if necessary, additional sealing barrier layers are formed in the dumped material. These barrier layers can be formed by injecting the Montan wax emulsion through injector lances or pressure probes. A sealing barrier layer, which consists partly of solid ground with embedded Montan wax emulsion on one side and dumped material with embedded Montan wax emulsion on the other side, is produced by making the sealing material above the ground and forcing it down into the dumped material and/or in the liquid permeable ground layer next to it and/or the natural fissures beyond the dump location and/or contaminated site. These sealing barrier layers are relatively easy to make and above all are water-resistant. Because of the flexibility of the sealing barrier layer it can be used both in solid and also in loose ground.

The composition of the modified Montan wax emulsion depends on the average grain size and permeability of the material being treated. With comparatively little pore volume in the material being treated it is necessary to provide a Montan wax emulsion with comparatively little solid additive material. With larger pore size sand-gravel materials and/or mixture finely dispersed filling materials care dispersed in the Montan wax emulsion.

The range of transmission and the propagation rate of the sealing material depends on the composition of the Montan wax emulsion, particularly the additive materials, the pressure of the injected emulsion and the pore volume of the material being treated. After a suitable working time the Montan wax emulsion, i.e. the Montan wax and additive materials, are forced into the pore space and gradually close the liquid permeable hollow space. This process is substantially accelerated by the mechanical or fluid jet mixing of the Montan wax emulsion. Since the Montan wax component in the Emulsion is resistant to basic and acid compounds in the ground water, whose components simultaneously determine the viscosity of the emulsion, a permanent plastic closure of the pore space of the refuse or garbage dump results.

Producing a barrier layer directly on the bottom of the refuse dump has the advantage that no communication with the under laying earth layers results through passages or holes in the ground.

In one embodiment a vertical barrier layer around the dumped material prevents the flow of ground water into and its mixing with the dumped material.

In another embodiment of the method by drawing up the peripheral portions of a sealing barrier layer extending horizontally under the polluted area to form of a dish-like sealing barrier layer, the vertical barrier layers, the so-called sealing walls, can be eliminated. This advantageous feature can be provided in the dump material itself as well as in solid and/or loose ground.

A cover-like closure, which prevents the mixing of surface water with the contaminated material, is provided by applying Montan wax emulsion on the upper surface of the polluted area to form a barrier cover layer.

Considerable cost savings result when the sealing barrier layers are each formed by mixing the Montan wax emulsion With portions of ground material or earth, ash, minerals, dumped material or the like.

The underground mixing occurs advantageously with a strong jet of water, i.e. in a water jet process. The Montan wax emulsion from nozzles can then be mixed intensively with ground material. A barrier layer with a thickness of 30 to 60 centimeters was surprisingly completely sufficient to achieve a reliable sealing.

A simple economical method results when advantageously injection lances and/or special pressure probes are used to force in the Montan wax emulsion from above ground or above the surface of the polluted area into the dumped material and/or the ground.

The barrier layer can be made in simple sequential steps in a method using a grid-like arrangement of the injection lances and/or pressure probes. The pressure probes can be built into underground passages in the ground or they can comprise a penetrometer, which is forced into the ground, and thus is self-sealing to the surrounding earth. Injection lances in contrast are jetted with pressurized water.

Because of that a precise control is possible, whether the adjacent injecting means is idle and the barrier layer should be completely sealed and/or a uniform reduction in permeability should be obtained. The time required for making the sealing barrier layers is effectively shortened by forcing the emulsion through the injecting means with high pressure.

An additional advantage is that during the introduction and withdrawal of the injector lances and/or special pressure probes already injection fluid is forced in and thus a transport of poisonous material from the polluted area can be prevented.

By using releasable lance tips lance orifices can be opened, e.g., by pulling back the injector lances, which results in an intensive nixing and, because of that, the permeable can be sealed effectively.

BRIEF DESCRIPTION OF THE DRAWING

The objects, features and advantages of the present invention will now be illustrated in more detail by the following detailed description, reference being made to the accompanying drawing in which:

FIG. 2 is a vertical cross-sectional view through the dump shown in FIG. 1 also illustrating the method for sealing the dump to prevent leakage of pollutants into the environment.

DESCRIPTION OF THE PREFERRED EMBODIMENTS

Figure 1:
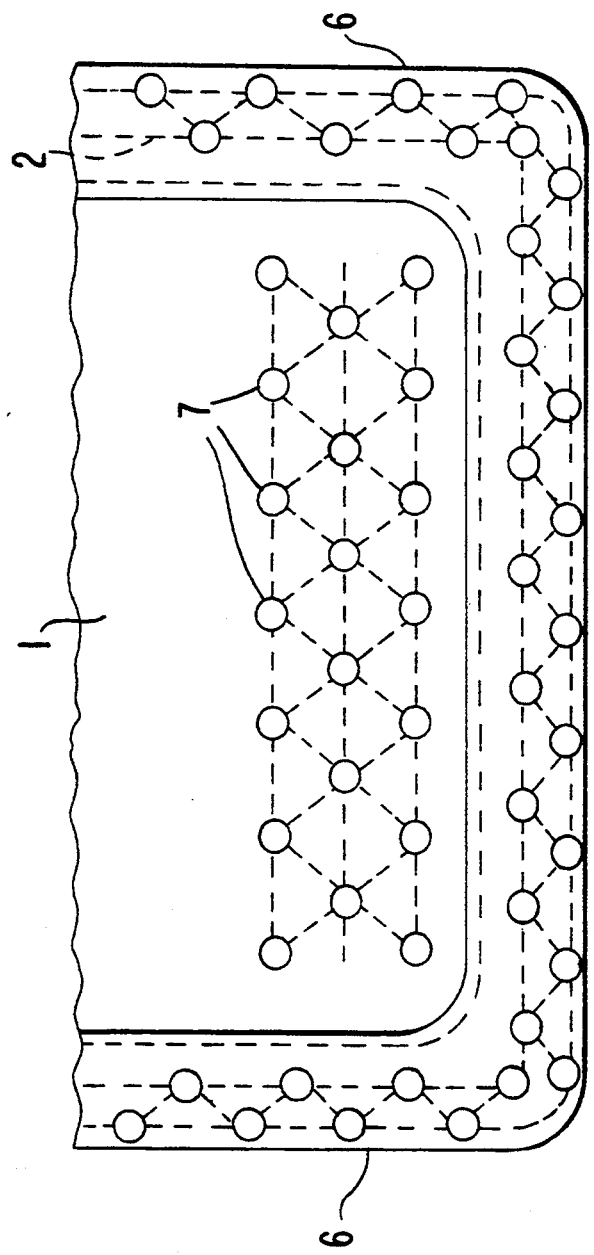
FIG. 1 is a cutaway top plan view of a pollutant containing refuse dump illustrating the method according to the invention.

A special injector ring 2 comprising a plurality of injector lances 8 extending vertically from the bottom 3 up to the surface of the dumped material 1 is provided surrounding the dumped material 1.

A bottom sealing barrier layer 4 is formed by the method on the bottom 3 of the refuse dump and a barrier cover layer 5 is formed over the dumped material 1.

A vertical sealing barrier layer 6 is formed by the special injector ring 2 which produces a curtain of sealing material around lateral edges of the dumped material 1. To make the bottom sealing barrier layer 4, a plurality of passages or holes 9 are drilled in a grid system or array 7 and extend down to a level of 2 meters above the bottom 3. The penetration is not extend further toward the bottom 3 to avoid leakage of pollutants into the environment. In the method of the invention a Montan wax emulsion is fed in through the injector lances or pressure probes 8 passing through the holes 9 to form the bottom sealing barrier layer 4. Of course some of the injector lances 8 can extend to a level which is higher than 2 meters to form the sealing barrier layer 6. The vertical sealing layer 6 and the bottom sealing barrier 4 can together be viewed as a single dish-like sealing barrier layer.

The Montan wax emulsion in this embodiment contains 16 parts by weight Montan wax, 3 parts by weight ethoxylated fatty alcohol and 100 parts of water.

In the preferred embodiment of the invention described here the Montan wax is unrefined Montan wax and in this example consists of 83% by weight wax components, 13% resin material and 4% asphalt material. The 83% by weight wax components include 57% ester component, 22% free acids and 4% free alcohols, ketones, lactones and hydrocarbon materials. The ethoxylated fatty alcohol is a fatty alcohol polyglycol ether ethoxylated with from 8 to 12 ethylene oxide molecules, preferably 9.

After successfully breaking the Montan wax emulsion and forcing the Montan wax molecules into the pore spaces of the dumped material 1 or the permeable surrounding ground and fissures 14 the injector lances 8 are simultaneously withdrawn with the sealing pipes 10 and filling of the holes 9 takes place. A barrier cover layer 5 is formed in the dumped material 1 so that no surface water can pass through the upper surface of the dumped material. If the surface of the dumped material 1 is already covered with ground 11, a barrier cover layer 5 for the dumped material can be provided in a manner similar to the bottom sealing barrier layer 4.

Alternatively, the Montan wax emulsion can be mechanically mixed with dumped material to form a more economical liquid sealing material. This economical sealing material is then used, e.g. to make the barrier cover layer 5.

The barrier cover layer 5 and the bottom sealing barrier layer 4 as well as the vertical sealing barrier layer can advantageously each have a thickness of 50 cm. The passages or holes 9 in the grid system 7 are advantageously spaced about 3 m from each other.

The injector lances 8 have removable tips 14 which detach when they become clogged. Circumferential weakened regions or some other device which breaks during pressurized feed or lance withdrawal can be provided.

The barrier cover layer 5 formed by the application of the Montan wax emulsion according to the invention remains elastically and plastically deformable. Because of that, deformation by outgassing and the like can occur without causing problems, since the barrier cover layer 5 is adjusted to or fits the dumped material 1.

While the invention has been illustrated and embodied in a method of sealing liquid permeable ground layers and fissures under and/or next to polluted areas to sanitize the polluted area and a liquid sealing material used to make the necessary sealing barrier layers, it is not intended to be limited to the details shown, since various modifications and composition changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects Of this invention.

What is desired to be protected by Letters Patent is set forth in the appended claims.

1. Method of sealing dumped material deposited in liquid permeable ground and containing pollutants to prevent leakage of the pollutants from the dumped material into the ground, said method comprising the step of feeding a liquid sealing material into at least one of the dumped material and the liquid permeable ground and fissures next to the dumped material, said liquid sealing material comprising a Montan wax emulsion.

2. Method as defined in claim 1, wherein the Montan wax emulsion comprises 10 to 20 parts by weight of a Montan wax, 3 to 5 parts by weight of an emulsifier and 100 parts by weight water.

3. Method as defined in claim 2, wherein said emulsifier is selected from the group consisting of ethoxylated fatty alcohols and mixtures of ionogenic materials and nonionogenic materials.

4. Method as defined in claim 3, wherein said ethoxylated fatty alcohols comprise fatty alcohol polyglycol ethers ethoxylated with from 8 to 12 ethylene oxide molecules, said ionogenic materials comprise sodium alkyl polyglycol ether sulfates containing 10 to 16 carbon atoms and said nonionogenic materials comprise alkyl phenyl polyglycol ethers containing 10 to 16 carbon atoms.

5. Method as defined in claim 2, wherein said Montan wax emulsion also includes up to 10 parts by weight of a stabilizer selected from the group consisting of polymers and mineral solids.

6. Method as defined in claim 5, wherein said mineral solids include clay.

7. Method as defined in claim 6, wherein said clay is bentonite.

8. Method as defined in claim 1, wherein said feeding includes feeding the liquid sealing material into the dumped material to form at least one sealing barrier layer.

9. Method as defined in claim 1, wherein said feeding includes feeding the liquid sealing material into a liquid permeable ground layer and the fissures in the ground to form at least one sealing barrier layer.

10. Method as defined in claim 1, wherein said feeding includes feeding the liquid sealing material into the liquid permeable ground and the fissures next to the polluted area.

11. Method as defined in claim 1, wherein said feeding includes forming a bottom sealing barrier layer extending over a bottom above the liquid permeable ground.

12. Method as defined in claim 1, wherein said feeding includes forming a vertical sealing barrier layer in at least one of the dumped material and the ground and fissures next to the dumped material, said vertical sealing barrier layer covering lateral edges of the dumped material.

13. Method as defined in claim 12, wherein the vertical sealing barrier layer is from 30 to 60 cm thick.

14. Method as defined in claim 1, wherein said feeding of the liquid sealing material includes feeding so as to form at least one dish-like sealing barrier layer extending substantially horizontally beyond lateral edges of the dumped material.

15. Method as defined in claim 14, wherein the dish-like sealing barrier layer is from 30 to 60 cm thick.

16. Method as defined in claim 1, further comprising forming a barrier cover layer in the dumped material to exclude surface water from the dumped material.

17. Method as defined in claim 16, wherein the barrier cover layer is from 30 to 60 cm thick.

18. Method as defined in claim 1, wherein the liquid sealing solution consists of a mixture of said Montan wax emulsion and a member selected from the group consisting of portions of said pollutants and portions of said ground.

19. Method as defined in claim 18, wherein the liquid sealing solution is a mixture of portions of said ground and said Montan wax emulsion formed by a water jet mixing process.

20. Method as defined in claim 1, wherein the feeding into the dumped material occurs through a plurality of feed means selected from the group consisting of injection lances and pressure probes.

21. Method as defined in claim 1, wherein the feeding into the liquid permeable ground next to the dumped material occurs through a plurality of feed means selected from the group consisting of injection lances and pressure probes.

22. Method as defined in claim 21, wherein the feeding of the Montan wax emulsion occurs during pressurizing and withdrawing of the injector lances.

23. Method as defined in claim 21, wherein said injection lances have removable lance tips.

24. Method as defined in claim 1, further comprising providing a grid-like array of feed means selected from the group consisting of injection lances and pressure probes for said feeding, said feed means being inserted through a surface of said ground and extending to a level determined by a location of a sealing barrier layer to be formed in said feeding.

25. Method as defined in claim 24, wherein the feeding occurs until a permeability of the ground is reduced to a sufficient extent.

26. Method as defined in claim 1, wherein the feeding is performed under pressure.

27. Liquid sealing material consisting of a Montan wax emulsion, said Montan wax emulsion consisting of from 10 to 20 parts by weight of a Montan wax, from 3 to 5 parts by weight of an emulsifier, 100 parts by weight of water and from 0 to 10 parts by weight of a stabilizer.

28. Liquid sealing material as defined in claim 27, wherein said emulsifier is selected from the group consisting of ethoxylated fatty alcohols and mixtures of ionogenic materials and nonionogenic materials.

29. Liquid sealing material as defined in claim 28, wherein said ethoxylated fatty alcohols comprise fatty alcohol polyglycol ethers ethoxylated with from 8 to 12 ethylene oxide molecules, said ionogenic materials comprise sodium alkyl polyglycol ether sulfates containing 10 to 16 carbon atoms and said nonionogenic materials comprise alkyl phenyl polyglycol ethers containing 10 to 16 carbon atoms.

30. Liquid sealing material as defined in claim 29, wherein said stabilizer is selected from the group consisting of polymers and mineral solids.

31. Liquid sealing material consisting of dumped material and Montan wax emulsion, said Montan wax emulsion consisting of from 10 to 20 parts by weight of a Montan wax, from 3 to 5 parts by weight of an emulsifier, 100 parts by weight of water and from 0 to 10 parts by weight of a stabilizer.

32. Liquid sealing material as defined in claim 31, wherein said emulsifier is selected from the group consisting of fatty alcohol polyglycol ethers ethoxylated with from 8 to 12 ethylene oxide molecules and mixtures of sodium alkyl polyglycol ether sulfates containing 10 to 16 carbon atoms and alkyl phenyl polyglycol ethers containing 10 to 16 carbon atoms.

33. Liquid sealing material consisting of a Montan wax emulsion consisting of 16 parts by weight of a Montan wax, 3 parts by weight of an ethoxylated fatty alcohol and 100 parts of water.

* * * * *